(12) United States Patent
Thisted (10) Patent No.: US 6,890,152 B1
(45) Date of Patent: May 10, 2005

(54) DEICING DEVICE FOR WIND TURBINE BLADES

(75) Inventor: Bo Thisted, Quincy, MA (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 10/678,246

(22) Filed: Oct. 3, 2003

(51) Int. Cl.[7] ............................................. F03D 11/00
(52) U.S. Cl. .............................. 416/1; 416/39; 416/41; 416/146 R
(58) Field of Search .............................. 415/17, 30, 47, 415/118; 416/37, 38, 39, 41, 146 R, 1; 60/39.093; 244/134 R (56) References Cited

U.S. PATENT DOCUMENTS

| 3,779,488 A | * | 12/1973 | Levin ...................... 244/134 A |
| 4,732,351 A | * | 3/1988 | Bird ........................ 244/134 D |
| 6,612,810 B1 | * | 9/2003 | Olsen et al. ................... 416/95 |

* cited by examiner

*Primary Examiner*—Ninh H. Nguyen
(74) *Attorney, Agent, or Firm*—Blakely, Sokoloff, Taylor & Zafman LLP (57) ABSTRACT

Methods and Apparatuses for deicing a wind turbine blade are described herein. In one embodiment, an exemplary process includes detecting an icy condition on a wind turbine blade and causing at least a portion of the wind turbine blade to vibrate, causing the ice built up on the wind turbine blade to break off.

26 Claims, 7 Drawing Sheets

DEICING DEVICE FOR WIND TURBINE BLADES

FIELD OF THE INVENTION

The present invention relates generally to wind turbines. More particularly, this invention relates to a deicing device for wind turbine blades.

BACKGROUND OF THE INVENTION

Wind turbines provide a primary source of energy that can be converted into electricity and supplied to utility power grids. Conversion of wind energy to electrical energy is accomplished in a wind turbine by driving an electrical generator, commonly an AC induction generator. Recently, wind turbines have received increased attention as environmentally safe and relatively inexpensive alternative energy sources. With this growing interest, considerable efforts have been made to develop wind turbines that are reliable, efficient, and have increased availability.

However, the recent efforts have not effectively addressed the loss of availability. Icing frequently adversely affects performance of the wind turbines during winter seasons. At times, icing is so severe that it prevents the turbines from producing power despite the existence of ideal wind conditions. In addition, the imbalance of the rotor may cause stress of both the blades and the drive train. Conventional deicing equipment utilized in the aircraft industry, such as inflatable boots, alcohol or heat are not viable options for a wind turbine. Thus, there is a need to efficiently prevent the buildup of an icy condition built up on the wind turbine blades.

SUMMARY OF THE DESCRIPTION

Methods and Apparatuses for deicing a wind turbine blade are described herein. In one embodiment, an exemplary process includes detecting an icy condition on a wind turbine blade and causing at least a portion of the wind turbine blade to vibrate, causing the ice built up on the wind turbine blade to break off.

Other features of the present invention will be apparent from the accompanying drawings and from the detailed description which follows.

BRIEF DESCRIPTION OF THE DRAWINGS

The present invention is illustrated by way of example and not limitation in the figures of the accompanying drawings in which like references indicate similar elements.

DETAILED DESCRIPTION

Deicing devices and methods for wind turbine blades are described herein. In the following description, numerous details are set forth to provide a more thorough explanation of the present invention. It will be apparent, however, to one skilled in the art, that the present invention may be practiced without these specific details. In other instances, well-known structures and devices are shown in block diagram form, rather than in detail, in order to avoid obscuring the present invention.

Figure 1:
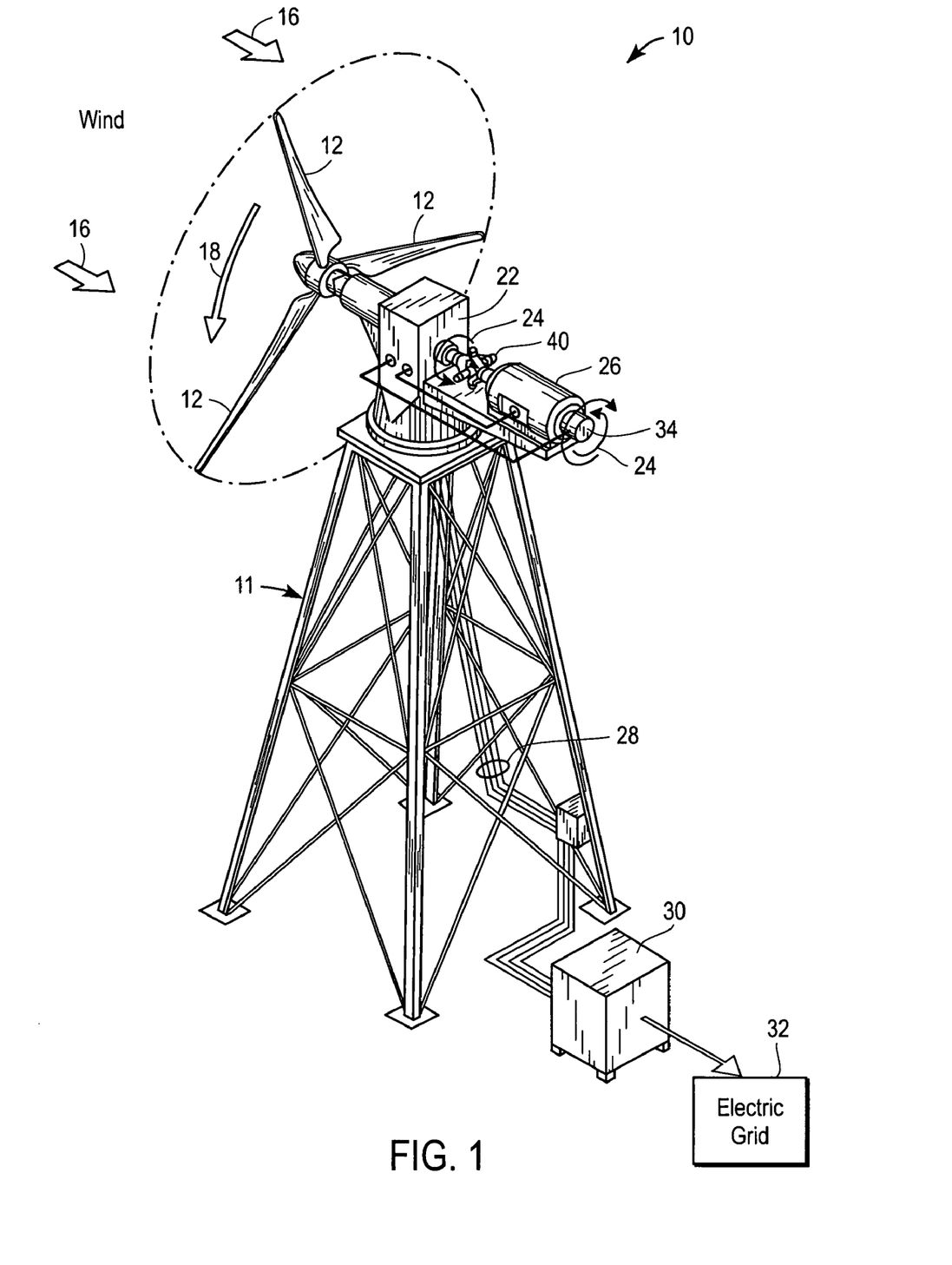
FIG. 1 is a block diagram of an embodiment of a wind turbine system.

FIG. 1 is a perspective view of an embodiment of a wind turbine generator. Referring to FIG. 1, an exemplary wind turbine is indicated generally at 10, mounted on a pedestal 11. Wind turbine 10 has one or more blades 12 connected to a shaft 14. When wind blows from the direction 16, the blades 12 and the shaft 14 rotate in the direction of arrow 18. However, in other embodiments, the rotational direction may be in the opposite direction from the direction of arrow 18 with equivalent but opposite effect. Furthermore, other wind turbine configurations, such as vertical axis wind turbine configurations, may be used with equal utility.

The wind, acting on the blades 12, supplies a torque to the shaft 14 in the rotational direction 18 and the amount of supplied torque is a function of the wind speed and rotor speed. The rotating shaft 14 turns a transmission 20 that is connected by a coupling 22 to a generator rotor that rotates in the direction of arrow 24. The rotor 22 turns within an electrical generator 26 to provide electrical power on an output cable 28. A power converter 30 is connected to cable 28 to convert the electrical power to a selected type of electrical power, such as three-phase, 60 Hz alternating current. The electrical power can then be delivered to an electrical grid 32 or any other load. The rotor speed may be monitored by a rotor speed sensor 34.

Figure 3A:
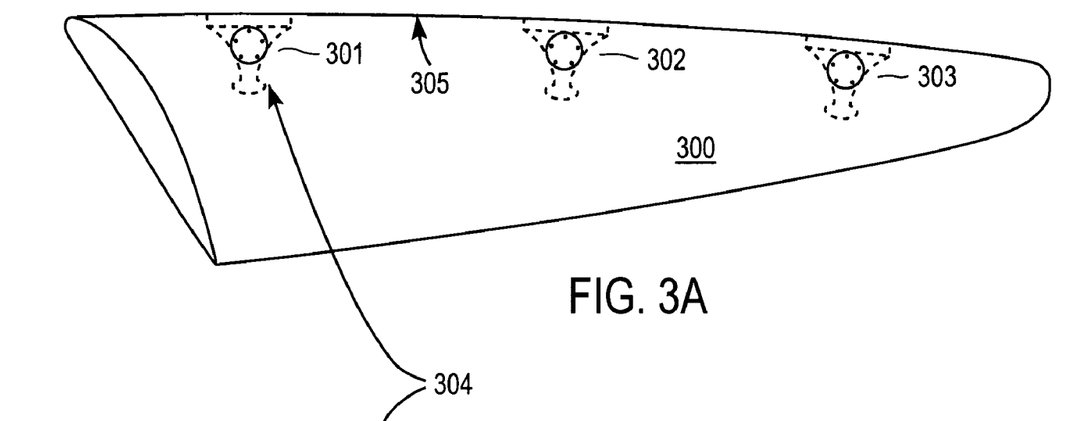
FIGS. 3A and 3B are block diagrams of an embodiment of a wind turbine blade having one or more vibrators in a perspective view and a cross section view respectively.
Figure 3B:
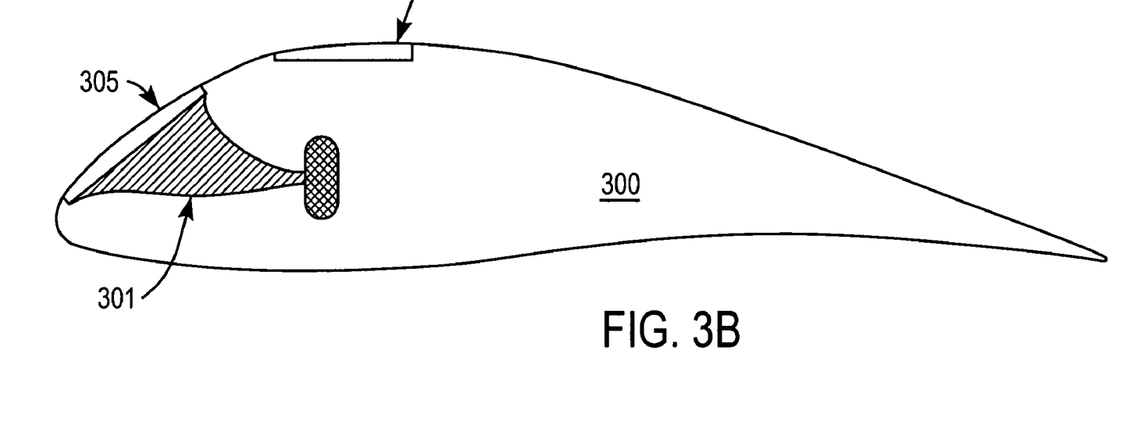

According to one embodiment, each of the blades 12 includes one or more vibrators, such as vibrators 301–303 of blade 300 shown in FIGS. 3A and 3B located within the blade, which when activated, cause the blades 12 to vibrate. The vibration of the blades 12 causes the ice built up on the blades to break off during a low temperature season. The one or more vibrators may be located within an outer surface (e.g., the skin) of the blades, which when activated, cause the outer surface of the blade to vibrate. As a result, the ice built up on the surface of the blade is broken off and the icy condition of the blade is removed.

Figure 3C:
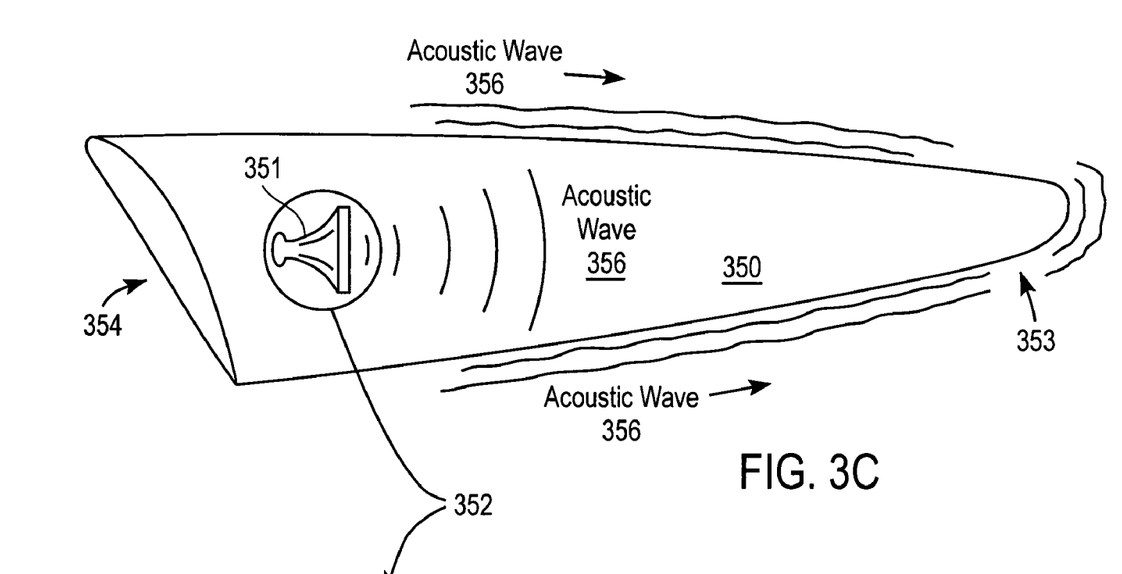
FIGS. 3C and 3D are block diagrams of an alternative embodiment of a wind turbine blade having one or more vibrators in a perspective view and a cross section view respectively.
Figure 3D:
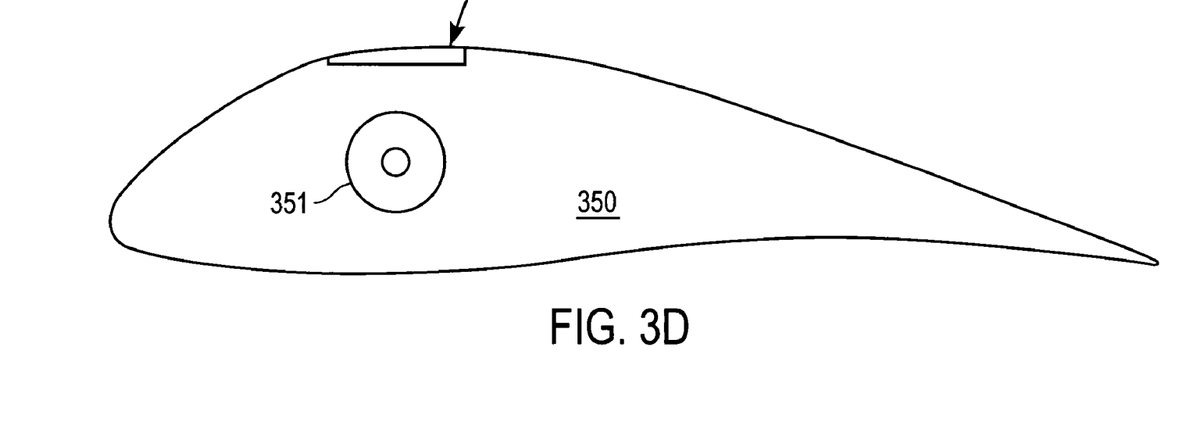
Figure 3E:
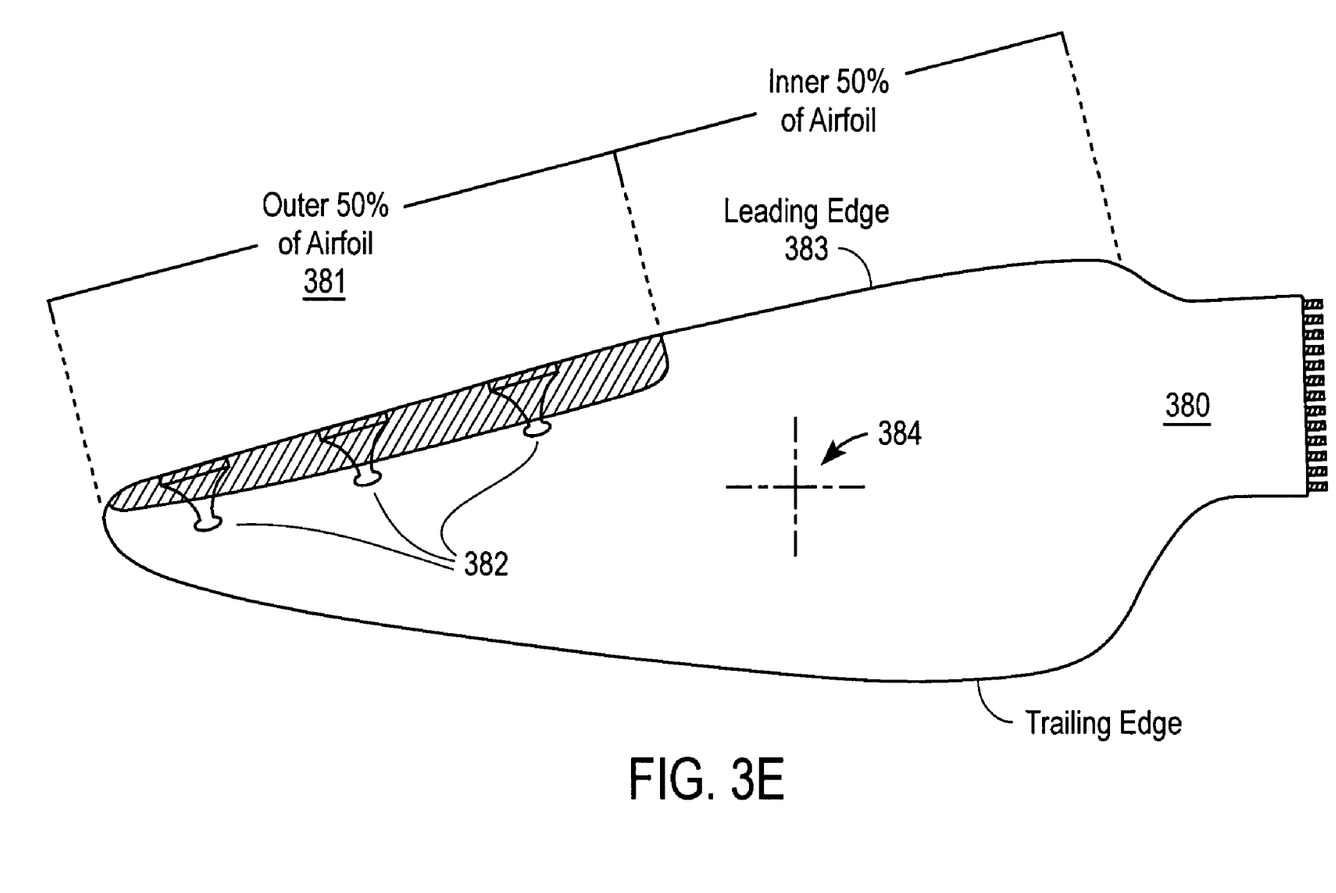
FIG. 3E is a block diagram of another embodiment of a wind turbine blade having one or more vibrators in a perspective view.

According to one embodiment, the vibrators may be located at or near the leading edge within the blade. In one embodiment, the vibrators may be located towards the leading edge of the airfoil where ice is most prone to develop, as shown in FIGS. 3A and 3B. Alternatively, according to an alternative embodiment, the vibrators may be located towards the relatively thicker part of the blades (e.g., the near end of the blades near shaft 14) as shown in FIGS. 3C and 3D, which may mechanically resonate a longer and flat or thin portion (e.g., the far end of the blades) of the blades when the vibrators are activated. Furthermore, according to another embodiment, the vibrators may be located towards the leading edge and in a region where ice is most prone to develop, such as region 381 as shown in FIG. 3E. The vibrators may include one or more acoustic wave generators, such as sonic horns, capable of generating an acoustic wave, which when at least one acoustic wave generator is activated, causes at least a portion of the blade, such as an outer surface of the blade to vibrate. The acoustic wave generators may be located near the root or near end of the blade and facing towards the far end of the blade parallel with the longitudinal axis of the blade to allow the acoustic wave be carried out towards the far end of the blade, as shown in FIGS. 3C and 3D. According to one embodiment, the vibrators may be controlled by a controller (not shown). When the controller detects the presence of an icy condition on the blades, the controller activates one or more vibrators within each blade to cause each blade to vibrate. Alternatively, the controller detects which blade individually has an icy condition and activates one or more vibrators of the respective blade to vibrate. Thus, only the vibrators of a subset of all the blades may be activated at one time.

The controller may rely on a set of parameters to determine whether there is ice built up on the blades. In one embodiment, the controller may determine that such an icy condition exists based on at least one of the wind speed, the power code associated with the power generated by the system, the rotor speed, and the temperature and/or humidity of the operating environment. The wind speed may be monitored via a wind speed observer. The rotor speed may be obtained via a rotor speed sensor, such as rotor speed sensor 34. The temperature may be measured via a temperature sensor, such as a thermal couple. For example, given the wind speed, during a normal operation, certain amount of power should be generated. If the controller determines that an unusual low amount of power is generated given the certain wind speed, the controller may determine that there may be an icy condition on the blades, by taking into account of a given temperature.

According to another embodiment, the detection of ice may be performed when the rotor of a wind turbine is not turning or just as the rotor starts to turn. In this embodiment, a combination of one or more sensors, such as, for example, rotor speed sensor 205, wind speed sensor observer 206, power detector 207, and thermal sensor 208 of FIG. 2, may be used to detect the presence of ice and monitor the imbalance loads at start-up where the rotor may be purposely held at a low speed for status "check-out" prior to letting the rotor go to full speed, because at full speed, the ice breaking off of the blades may become projectile like and may cause damage to structure of the blades and injury to a personnel hit by the flying ice. For example, when the operating temperature is below 36° F. with relatively high humidity, it is most likely that ice forms on the blades.

It will be appreciated that other parameters or factors may be considered by the controller. As described above, when there is an icy condition on the blades, the blades may be slowed down or even stopped by the ice, which may cause the imbalance of the rotor which may cause stress of both blades and drive train. Monitoring the operating conditions of the blades and removing the icy condition in a timely manner prevents the damage to the system and maintain the efficiency of the power generation.

Once the controller detects that there is an icy condition on the blades, the controller may activate (e.g., providing power) one or more vibrators of the blades which cause the blades to vibrate. As a result, the ice built up on the surfaces of the blades may be broken off. According to one embodiment, the one or more vibrators located within the blades may be activated for a certain period of time for every certain period. In a particular embodiment, the vibrators of the blades are activated for approximately 15 seconds for every 15 minutes when the icy condition is detected. The activation of the vibrators may continue until the icy condition is substantially removed from the blades. During the vibration, the controller may continuously monitor the parameters described above to determine whether the icy condition has been removed. Note that the vibration of the blades should be maintained strong enough to break off the ice built up, but not strong enough to cause structural damage to the blades.

According to one embodiment, the amplitude and frequency of the vibration may be determined by taking into account of the materials that make up the blades, such that the vibration would not cause structural damage to the blades. For example, the amplitude, frequency, the duration of the vibration may be determined based on the type of the respective blade, such as, for example, carbon blade vs. fiber glass blade, etc. The vibration of a carbon blade may have lower amplitude than a fiberglass blade. In addition, the amplitude, frequency, and duration of the vibration may be determined based on one, more or all of the size, surface, and shape of the respective blade. A higher frequency vibration may be applied to a shorter blade and a lower frequency vibration may be applied to a longer blade. Furthermore, a higher amplitude and lower frequency vibration may be applied to a thicker blade (e.g., a blade having higher chord to length airfoil). In contrast, a lower amplitude and higher frequency vibration may be applied to a stiffer blade. Other factors may be taken into account when determining the amplitude, frequency, and duration of the vibration.

In one embodiment, the controller may be implemented locally within exemplary system 10. For example, the controller may be implemented within transmission 20 or power converter 30. Alternatively, the controller may be implemented as a data processing system, such as a computer, which may be located remotely over a network. The parameters used to detect the icy condition may be measured locally through a variety of sensors and the data obtained may be transmitted to the remote data processing system over a network to perform the determination of an icy condition. In response to the detection, the system transmits a command, via a network, to activate one or more vibrators of the blades to vibrate. Furthermore, the data processing system may be implemented as a central processing system that monitors and controls multiple wind turbine systems, such as system 10 of FIG. 1, over a network.

According to one embodiment, the vibrators may be commercially available electromagnetic vibrators. For example, the vibrators may be similar to those used in many material conveyor processes to shake the sides of bins and other large containers to free up the product being conveyed. In a particular embodiment, the vibrators may be sonic horns that when activated, are capable of generating low frequency acoustic wave that causes the blade to vibrate. The sonic horns may be located within the blades. Each blade may contain one or more sonic horns which may be located at or near the leading edge of the blade. According to one embodiment, the sonic horn may generate an acoustic wave having a predetermined range of frequencies, such as, for example, ranging approximately from 5 to 500 Hz. The magnitude and frequency of the acoustic wave may be determined by taking into account of the material of the blades, such that the vibration caused by the acoustic wave does not cause structural damage of the blade (e.g., resonant side effects).

The controller is coupled to the sonic horns of each blade. When the controller detects that an icy condition exists, the controller activates one or more sonic horns of each blade to blast continuously for a period of time, such as, for example, approximately 15 seconds for every 15 minutes, until the icy condition is substantially removed. The determination of whether the icy condition has been substantially removed may also be monitored by the controller based in part on at least one of the parameters set forth above, such as, for example, the wind speed, the rotor speed, the temperature, and the power code associated with the amount of power generated by the system, etc. It will be appreciated that other parameters or factors may be considered.

Figure 2:
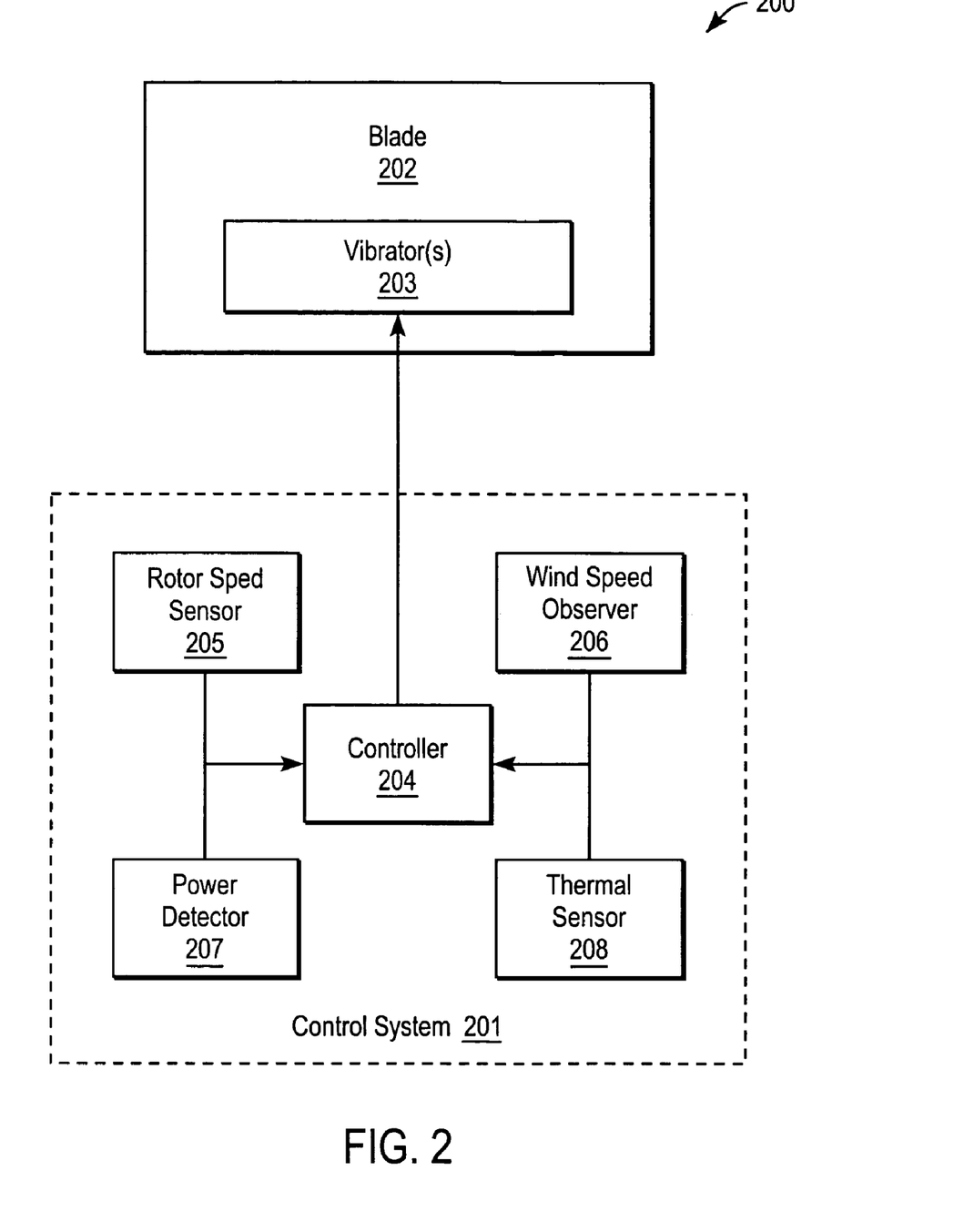
FIG. 2 is a block diagram of an embodiment of a control system controlling one or more vibrators of a blade.

FIG. 2 is a block diagram illustrating an exemplary embodiment of a control system controlling one or more vibrators of a blade. According to one embodiment, exemplary system 200 includes one or more blades, each blade including one or more vibrators capable of causing at least a portion of the blade to vibrate when an icy condition is detected on the blade. According to an alternative embodiment, exemplary system 200 further includes a controller coupled to the one or more vibrators and one or more sensors of each blade to detect an icy condition on the blades and to cause, via the one or more vibrators, the blades to vibrate in response to the detection of the icy condition.

Referring to FIG. 2, according to one embodiment, exemplary system 200 includes control system 201 coupled to one or more vibrators 203 of each blade 202 of a wind turbine. Vibrators 203 may be located within blade 202, preferably within an outer surface (e.g., skin) of the blade. According to an alternative embodiment, vibrators 203 may be allocated at or near the leading edge of the blade, such as leading edge 305 of blade 300 shown in FIGS. 3A and 3B. In a particular embodiment, vibrators 203 may be sonic horns that when activated, produce an acoustic wave with a frequency of approximately 5 to 500 Hz, to cause blade 202 to vibrate, which would break off any ice built up on blade 202.

According to one embodiment, control system 201 includes controller 204 coupled to rotor speed sensor 205 (similar to rotor speed sensor 34 of FIG. 1), wind speed observer 206, power detector 207, and thermal sensor 208. Rotor speed sensor 205 may provide a current speed of the rotor, such as rotor 22 of FIG. 1. Wind speed observer 206 may provide an estimate of the current wind speed. Power detector 207 may provide an estimate of amount of power currently generated based on a power code or power codes associated with the amount of power generated. Thermal sensor 208 may provide an estimate of a current temperature of the operating environment. It will be appreciated that control system 201 may include other sensors or detectors to collect other related information, such as the humidity or dew point of the operating environment.

According to one embodiment, controller 204 collects the information described above (e.g., from rotor speed sensor 205, wind speed observer 206, power detector 207, and thermal sensor 208) necessary to make a decision whether there is an icy condition on blade 202. If controller 204 determines that there is an icy condition on blade 202, controller 204 may activate (e.g., provide power) one or more vibrators 203 to cause blade 202 to vibrate. Vibrators 203 may be activated periodically for a period of time, such as, for example, approximately 15 seconds for every 15 minutes, until the icy condition has been greatly reduced.

According to one embodiment, control system 201 may be implemented as a single system located locally, such as, for example, within wind turbine 10 of FIG. 1, through a direct connection 209. Alternatively, the components of control system 201, such as controller 204, rotor speed sensor 205, wind speed observer 206, power detector 207, and thermal sensor 208, may be located at different locations. For example, rotor speed sensor 205, wind speed observer 206, and thermal sensor 208 may be located within or near transmission 20 of FIG. 1, while power detector 207 may be located within power converter 30 of FIG. 1. Controller 204, as described above, may be a remote data processing system or server coupled to components 205–208 over a network, such as, for example, a local area network (e.g., Intranet) or a wide area network (e.g., Internet), or alternatively a wireless network. Once controller 204 determines, based on the information collected from components 205–208, that there is an icy condition on blade 202, controller 204 may activate, via a network connection (e.g., connection 209 with a variety of communication protocols, such as a TCP/IP protocol or a wireless protocol), one or more vibrators 203 to vibrate within blade 202 to remove the icy condition of blade 202. Other operations may be included.

FIGS. 3A and 3B are diagrams illustrating an embodiment of a wind turbine blade in a perspective view and a cross section view respectively. According to one embodiment, exemplary blade 300 includes one or more vibrators 301–303, which when activated, would cause at least a portion of blade 300 to vibrate. The vibration is strong enough to remove the icy condition built up on blade 300 without causing structural damage to blade 300. The vibrators are not limited to three vibrators as shown in FIG. 3A, more or less vibrators may be implemented dependent upon the design specification, such as the size or length, of blade 300. In one embodiment, vibrators 301–303 are located at or near the leading edge 305 of blade 300.

According to one embodiment, the vibrators 301–303 may be commercially available electromagnetic vibrators. For example, the vibrators 301–303 may be similar to those used in many material conveyor processes to shake the sides of bins and other large containers to free up the product being conveyed. In a particular embodiment, the vibrators 301–303 may be sonic horns which when activated, are capable of generating an acoustic wave with a frequency of approximately 5 to 500 Hz, that causes the blade to vibrate. The amplitude and frequency of the vibration may be designed by taking into account of the material of blade 300, such that the vibration would not cause structural damage of blade 300.

According to one embodiment, each of vibrators 301–303 is coupled to a controller, such as controller 204 of FIG. 2, which may be located locally or remotely. When the controller determines, via one of the aforementioned techniques, that there is an icy condition on blade 300, the controller activates at least one of vibrators 301–303 to vibrate, which cause at least a portion of blade 300 to vibrate, in order to remove the icy condition from blade 300. In one embodiment, the controller may activate all vibrators 301–303 at the same time. Alternatively, the controller may activate one of vibrators 301–303 individually. Furthermore, vibrators 301–303 may be activated one at a time sequentially, such that a region of blade 300 may vibrate at a time to avoid the whole blade to vibrate, which may cause structural damage of blade 300.

In addition, blade 300 may include one or more openings 304 for accessing vibrators 301–303. The size of the opening 304 may vary dependent upon the size of vibrators 301–303. The open should be large enough for the purposes of inspection, replacement, or repair of vibrators 301–303. Other components may be included.

FIGS. 3C and 3D are diagrams illustrating an alternative embodiment of a wind turbine blade in a perspective view and a cross section view respectively. According to one embodiment, exemplary blade 350 includes one or more vibrators 351, which when activated, causes at least a portion of blade 350 to vibrate. The vibration is strong enough to remove the icy condition built up on blade 350 without causing structural damage to blade 350. The vibrators are not limited to one vibrator as shown in FIG. 3C for the illustration purposes, more or less vibrators may be included dependent upon the design specification, such as the size or length, of blade 350. In this embodiment, vibrator 351 is located at or near the root portion, also referred to as near end 354, of blade 350 and facing towards far end 353 of blade 350 parallel with the longitudinal axis of the blade to allow the vibration be carried out towards far end 353 of blade 350, as indicated by arrow 356.

According to one embodiment, vibrator 351 may be a commercially available electromagnetic vibrator. For example, vibrator 351 may be similar to those used in many material conveyor processes to shake the sides of bins and other large containers to free up the product being conveyed.

According to another embodiment, vibrator 351 may be an acoustic wave generator, such as a sonic horn, which when activated, is capable of generating an acoustic wave having a frequency of approximately 5 to 500 Hz, causing at least a portion of blade 350, such as an outer surface of blade 350, to vibrate. The amplitude and frequency of the vibration may be determined by taking into account of the material of blade 350, such that the vibration would not cause structural damage of blade 350.

According to one embodiment, vibrator 351 is coupled to a controller, such as controller 204 of FIG. 2, which may be located locally or remotely. When the controller determines, via one of the aforementioned techniques, that there is an icy condition on blade 350, the controller activates vibrator 351 to vibrate, which cause at least a portion of blade 350 to vibrate, in order to remove the icy condition from blade 350.

In addition, blade 350 may include an opening 352 for accessing vibrator 351. The size of the opening 352 may vary dependent upon the size of vibrator 351. The opening should be large enough for the purposes of inspection, replacement, or repair of vibrator 351. Other components may be included.

FIG. 3E is a diagram illustrating an embodiment of a wind turbine blade in a perspective view. According to one embodiment, exemplary blade 380 includes one or more vibrators 382, which when activated, would cause at least a portion of blade 380 to vibrate. The vibration is strong enough to remove the icy condition built up on blade 380 without causing structural damage to blade 380. The vibrators are not limited to three vibrators as shown in FIG. 3E, more or less vibrators may be implemented dependent upon the design specification, such as the size or length, of blade 380. In this embodiment, vibrators 382 are located within a region 381 of the blade towards the leading edge 383 of blade 380, where ice is most prone to develop. This is typically useful when the blade is operating and the ice is formed most likely on the far end of the blade.

Alternatively, according to a further embodiment, the vibrators may be located within a relatively center region 384 of blade 380, which when the vibrators are activated, the vibrators may be able to cause the whole blade to vibrate. This is typically useful when the blade is not operating (e.g., spinning) and the ice may be formed all over the blade. It will be appreciated that the locations of the vibrators are not limited to those shown in FIGS. 3A–3E, other locations may be used to install the vibrators, dependent upon where the ice will likely be formed on the blade. For example, the one or more vibrators may be relatively evenly located within an outer surface of the blade. Other configurations apparent to one with ordinary skill in the art may exist.

Figure 4:
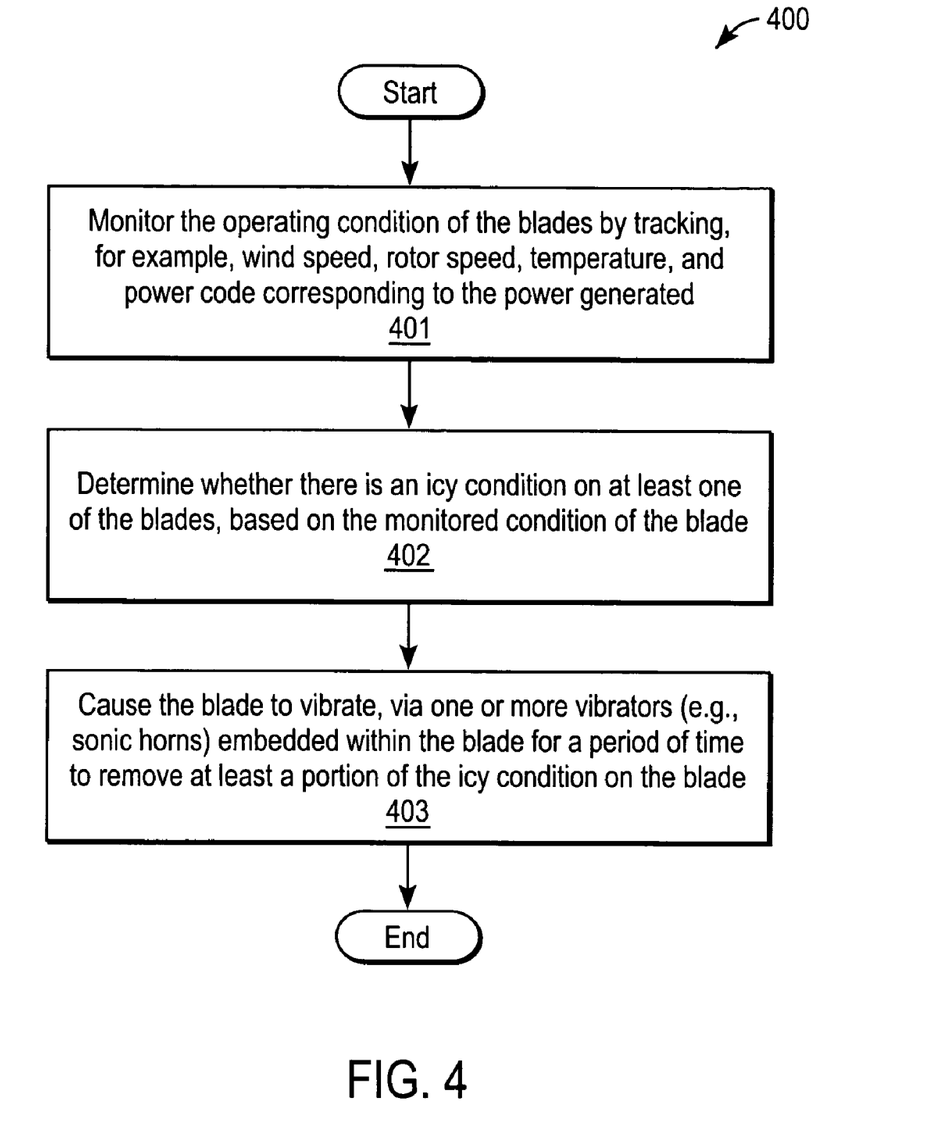
FIG. 4 is a flow diagram illustrating an embodiment of a process for deicing a wind turbine blade.

FIG. 4 is a flow diagram illustrating an embodiment of a process for deicing a wind turbine blade. Exemplary process 400 may be performed by one or more processing logic that may include hardware (circuitry, dedicated logic, etc.), software (such as is run on a general purpose computer system or a dedicated machine), or a combination of both. In one embodiment, exemplary process 400 includes detecting an icy condition on a wind turbine blade and causing the wind turbine blade to vibrate in such a way that breaks off ice built up, in response to the detection of the icy condition.

Referring to FIG. 4, at block 401, the processing logic, which may be implemented within a controller, such as controller 204 of FIG. 2, monitors the operating conditions of the blades of a wind turbine, such as, for example, the wind speed, rotor speed, temperature, and the power code associated with the amount of power generated. Based on the monitored information, at block 402, the processing logic determines whether there is an icy condition on at least one of the blades. If there is an icy condition on the blades, at block 403, the processing logic activates one or more vibrators on the blade to vibrate, which causes at least a portion of the blade to vibrate in order to remove at least a portion of the icy condition. The vibrators may be activated periodically for a period of time during the icy condition. In one embodiment, the vibrators are activated for approximately 15 seconds for every 15 minutes. Other operations may be included.

Figure 5:
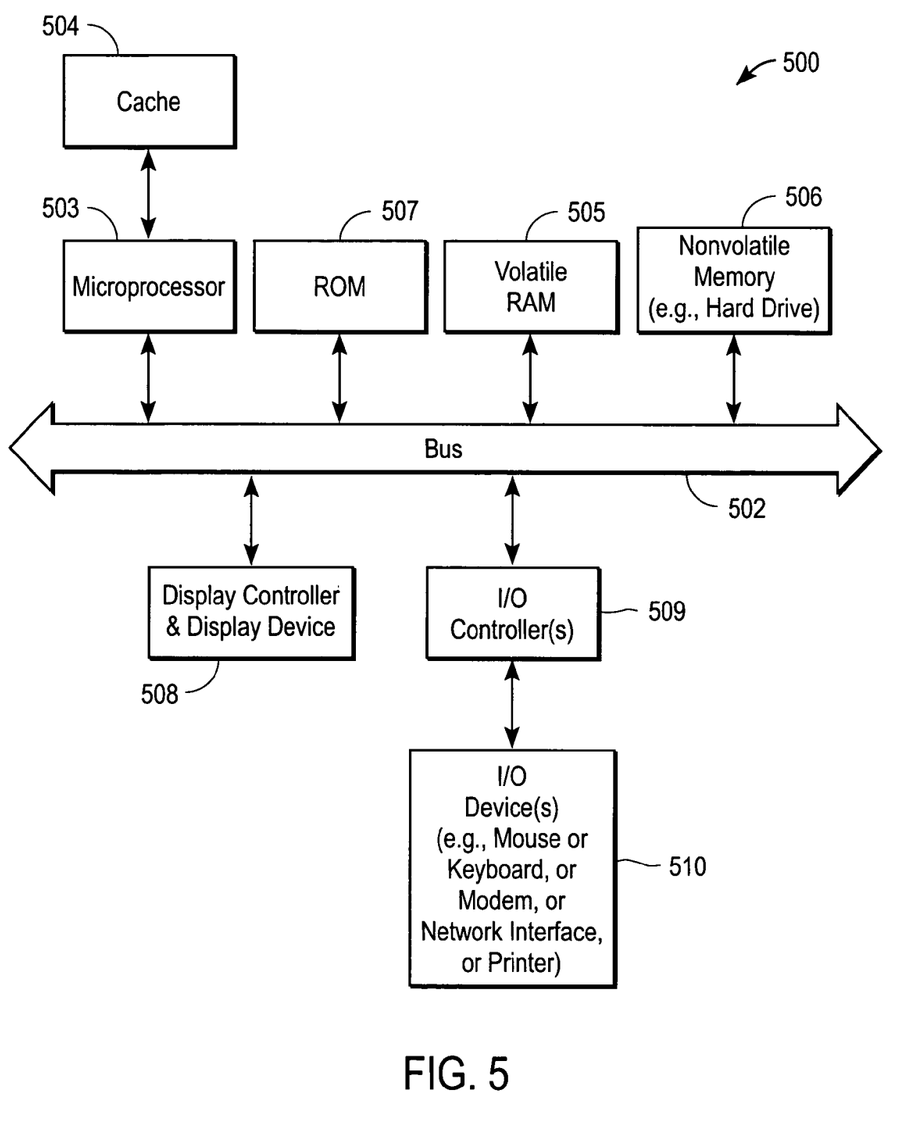
FIG. 5 is a block diagram of an exemplary data processing system.

FIG. 5 is a block diagram of a digital processing system which may be used with one embodiment of the invention. For example, the system 500 shown in FIG. 5 may be used as a control system 201 or controller 204 of FIG. 2 to monitor data collected by rotor speed sensor 205, wind speed observer 206, power detector 207, and thermal sensor 208, and to control (e.g., activate or de-activate) vibrators 203 of blade 202 in response to the detection.

Note that while FIG. 5 illustrates various components of a computer system, it is not intended to represent any particular architecture or manner of interconnecting the components, as such details are not germane to the present invention. It will also be appreciated that network computers, handheld computers, cell phones, and other data processing systems which have fewer components or perhaps more components may also be used with the present invention. The computer system of FIG. 5 may, for example, be an Apple Macintosh computer or an IBM compatible computer or other computer running another type of operating system.

As shown in FIG. 5, the computer system 500, which is a form of a data processing system, includes a bus 502 which is coupled to a microprocessor 503 and a ROM 507, a volatile RAM 505, and a non-volatile memory 506. The microprocessor 503, which may be a PowerPC G3 or PowerPC G4 microprocessor from Motorola, Inc. or IBM, or alternatively, a Pentium processor from Intel Corporation, is coupled to cache memory 504 as shown in the example of FIG. 5. The bus 502 interconnects these various components together and also interconnects these components 503, 507, 505, and 506 to a display controller and display device 508, as well as to input/output (I/O) devices 510, which may be mice, keyboards, modems, network interfaces, printers, and other devices which are well-known in the art. Typically, the input/output devices 510 are coupled to the system through input/output controllers 509. The volatile RAM 505 is typically implemented as dynamic RAM (DRAM) which requires power continuously in order to refresh or maintain the data in the memory. The non-volatile memory 506 is typically a magnetic hard drive, a magnetic optical drive, an optical drive, or a DVD RAM or other type of memory system which maintains data even after power is removed from the system. Typically the non-volatile memory will also be a random access memory, although this is not required. While FIG. 5 shows that the non-volatile memory is a local device coupled directly to the rest of the components in the data processing system, it will be appreciated that the present invention may utilize a non-volatile memory which is remote from the system, such as a network storage device which is coupled to the data processing system through a network interface such as a modem or Ethernet interface. The bus 502 may include one or more buses connected to each other through various bridges, controllers, and/or adapters, as is well-known in the art. In one embodiment, the I/O controller 509 includes a USB (Universal Serial Bus) adapter for controlling USB peripherals.

According to one embodiment, exemplary system 500 may be located locally directly coupled, via one or more I/O controllers 509, to the vibrators and other components, such as rotor speed sensor, wind speed observer, power detector, and thermal sensor shown in FIG. 2. Alternatively, exemplary system 500 may be a remote data processing system or server over a network via a network interface 510. Other configurations may exist.

Thus, deicing devices for wind turbine blades have been described. In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A method for deicing wind turbine blades, the method comprising:
   detecting an icy condition on a wind turbine blade; and
   causing at least a portion of the wind turbine blade to vibrate to break off ice thereon, in response to the detection of the icy condition.

2. The method of claim 1, wherein causing a vibration on the wind turbine blade comprises generating an acoustic wave having a magnitude and frequency within the wind turbine blade to cause the wind turbine blade to vibrate.

3. The method of claim 2, wherein the frequency is ranging approximately from 5 to 500 Hz.

4. The method of claim 3, wherein the acoustic wave is generated periodically for a period of time until the icy condition is substantially removed.

5. The method of claim 2, wherein the acoustic wave is generated via one or more sonic horns located within the wind turbine blade.

6. The method of claim 1, wherein the vibration of the wind turbine blade occurs periodically for a period of time when the icy condition is detected.

7. The method of claim 6, wherein the vibration of the wind turbine occurs for approximately 15 seconds for approximately every 15 minutes.

8. The method of claim 1, wherein the vibration of the wind turbine blade is caused on an outer surface of the wind turbine blade by one or more vibrators located within the blade material or located within the blade structure.

9. The method of claim 1, wherein the vibration of the wind turbine blade is strong enough to break off the ice built up without causing structural damage of the wind turbine blade.

10. The method of claim 1, further comprising monitoring one or more operating parameters of the wind turbine, wherein the icy condition is determined based on at least one of the monitored operating parameters.

11. The method of claim 10, wherein the one or more operating parameters includes at least one of wind speed, power generated, rotor speed, and temperature.

12. A wind turbine system, comprising:
   a plurality of blades having one or more vibrators located therein; and
   a controller coupled to the plurality of blades to detect an icy condition on at least one of the plurality of blades and to cause, via the one or more vibrators, the at least one of the plurality of blades to vibrate in response to the detection of the icy condition.

13. The wind turbine system of claim 12, wherein the vibration of each blade is strong enough to break off ice built up on the blade without causing structural damage of the blade.

14. The wind turbine system of claim 12, wherein the one or more vibrators vibrate periodically for a period of time, in response to the detection performed by the controller.

15. The wind turbine system of claim 14, wherein the one or more vibrators vibrate for approximately 15 seconds for approximately every 15 minutes.

16. The wind turbine system of claim 12, wherein the one or more vibrators are made from one or more sonic horns capable of generating an acoustic wave having a frequency to cause the blade to vibrate.

17. The wind turbine system of claim 16, wherein the frequency of the acoustic wave is ranging approximately from 5 to 500 Hz.

18. The wind turbine system of claim 12, wherein the controller monitors one or more operating parameters of the wind turbine system, and wherein the icy condition is determined based on at least one of the operating parameters.

19. The wind turbine system of claim 18, wherein the one or more parameters includes at least one of wind speed, power generated, rotor speed, and temperature.

20. The wind turbine system of claim 12, wherein the one or more vibrators are located at or near a leading edge within the blade.

21. The wind turbine system of claim 12, wherein the one or more vibrators are located within a relatively center region of the blade.

22. A system for deicing wind turbine blades, the system comprising:
   means for detecting an icy condition on a wind turbine blade; and
   means for causing at least a portion of the wind turbine blade to vibrate to break off ice thereon, in response to the detection of the icy condition.

23. The system of claim 22, wherein means for causing a vibration on the wind turbine blade comprises means for generating an acoustic wave within the wind turbine blade to cause the wind turbine blade to vibrate, the acoustic wave having a predetermined frequency.

24. The system of claim 23, wherein the acoustic wave is generated via one or more sonic horns located within the wind turbine blade.

25. The system of claim 22, further comprising means for monitoring one or more operating parameters of the wind turbine, wherein the icy condition is determined based on at least one of wind speed, power generated, rotor speed, and temperature.

26. The system of claim 22, wherein the vibration of the wind turbine blade is generated via one or more electromechanical vibrators located within the blade.

* * * * *